United States Patent [19]

Ikeuchi

[11] Patent Number: 5,313,383
[45] Date of Patent: May 17, 1994

[54] DC—DC CONVERTER

[75] Inventor: Hiroshi Ikeuchi, Yokosuka, Japan

[73] Assignee: Murata Manufacturing Co., Ltd., Kyoto, Japan

[21] Appl. No.: 988,890

[22] Filed: Dec. 29, 1992

Related U.S. Application Data

[63] Continuation of Ser. No. 797,751, Nov. 25, 1991, abandoned.

[30] Foreign Application Priority Data

Nov. 30, 1990 [JP] Japan ................ 2-337371

[51] Int. Cl.$^5$ ............................................. H02M 3/335
[52] U.S. Cl. ......................................... 363/21; 363/89; 323/222
[58] Field of Search .................... 363/20, 21, 131, 97, 363/16, 89, 86; 323/22; H02M 3/145, 3/28, 3/155–158, 3/335

[56] References Cited

U.S. PATENT DOCUMENTS

| | | | |
|---|---|---|---|
| 4,253,136 | 2/1981 | Nanko | 363/21 |
| 4,857,822 | 8/1989 | Tabisz et al. | 323/282 |
| 4,860,184 | 8/1989 | Tabisz et al. | 363/17 |
| 4,870,555 | 9/1989 | White | 363/21 |
| 4,926,304 | 5/1990 | Marinus | 363/20 |

Primary Examiner—Steven L. Stephan
Assistant Examiner—Adolf Berhane
Attorney, Agent, or Firm—Jordan and Hamburg

[57] ABSTRACT

A DC—DC converter wherein, a DC power supply, a coil, and a main switch are connected in parallel, a resonant capacitor is connected in parallel with the main switch, a rectifier is connected to the coil for DC output to be provided from both ends of the coil, and a control switch is connected in parallel with the coil for allowing current due to energy accumulated in the coil to flow when the main switch is OFF.

4 Claims, 6 Drawing Sheets

DC—DC CONVERTER

This application is a continuation, of application Ser. No. 07/797,751, filed Nov. 25, 1991, now abandoned.

BACKGROUND OF THE INVENTION

1. Field of the Invention

This invention relates to a DC—DC converter, and more particularly to a DC—DC converter based on a forward type which can be built as a compact one with low price.

2. Description of the Prior Art

FIG. 5 shows the DC—DC converter disclosed in Japanese Patent Laid-Open Publication No. HEI2-65659.

In this DC—DC converter 51, current flow to the coil L by turning ON the transistor Tr, and energy is accumulated in the coil L from the DC power supply Eb. Then, when the transistor Tr is turned OFF, resonance is generated by the coil L and the resonant capacitor C. If voltage in the coil L is in the reverse direction to that in the DC power supply Eb, energy accumulated in the coil L flows to the smoothing capacitor CF as DC output and furthermore is supplied to the load RL.

The DC output can be stabilized by adjusting the transistor Tr ON period and setting the ON/OFF cycle constant.

On the other hand, when the switch S is turned ON during the time that the transistor Tr is ON, current due to energy accumulated in the coil L flows through the diode D, so that resonance is stopped.

The conventional DC—DC converter 51 described above is based on a flyback type, which causes many problems. For instance, a peak value of the charging current flowing via the rectifier DD to the smoothing capacitor CF becomes larger and the coil L, rectifier DD and smoothing capacitor CF must all be usable for large current.

Also, since energy of about 2 times larger than the output energy must be accumulated in the coil L during the transistor Tr ON period, the size of the coil L becomes large.

Also, as a peak value of the current is large, much noise is generated.

Thus, the object of this invention is to provide a DC—DC converter, in which components such as a coil, a rectifier and so on for small current are available and which can be minimized in size and in which noise is not generated much.

SUMMARY OF THE INVENTION

This invention provides a DC—DC converter wherein, a DC power supply, a coil, and a main switch are connected in parallel, a resonant capacitor is connected in parallel with the aforesaid main switch, a rectifier is connected to the aforesaid coil or another coil electromagnetically linked to the aforesaid coil for DC output to be provided from both ends of the aforesaid coil or other coil, and furthermore a control switch is connected in parallel with the aforesaid coil or other coil for allowing current due to energy accumulated in the aforesaid coil or other coil to flow when the aforesaid main switch is OFF.

The DC—DC converter according to this invention is a forward type wherein DC output is taken out via a rectifier when the main switch is ON.

In this type, a peak value of the current flowing in the coil or the rectifier becomes smaller, so that coils and rectifier for smaller current can be used.

Also, since the output energy is not accumulated in the coil, a smaller coil can be used.

Additionally, since the peak value of the current is small, the noise generation becomes lower.

DESCRIPTION OF THE PREFERRED EMBODIMENTS

Figure 1A:
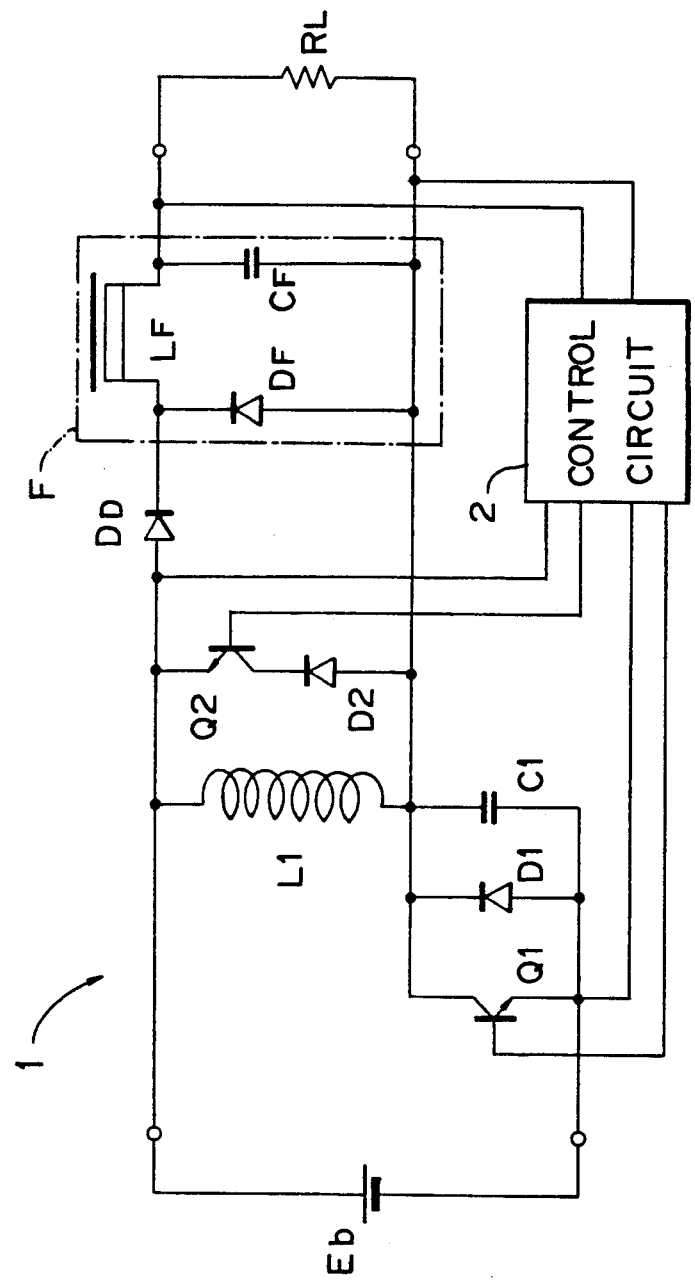
FIG. 1(a) is a circuit diagram of the first embodiment of this invention.

Description is made in detail hereinunder for this invention with reference to the embodiments illustrated in the drawings. This invention is not limited to the embodiments described hereinunder.

Figure 1B:
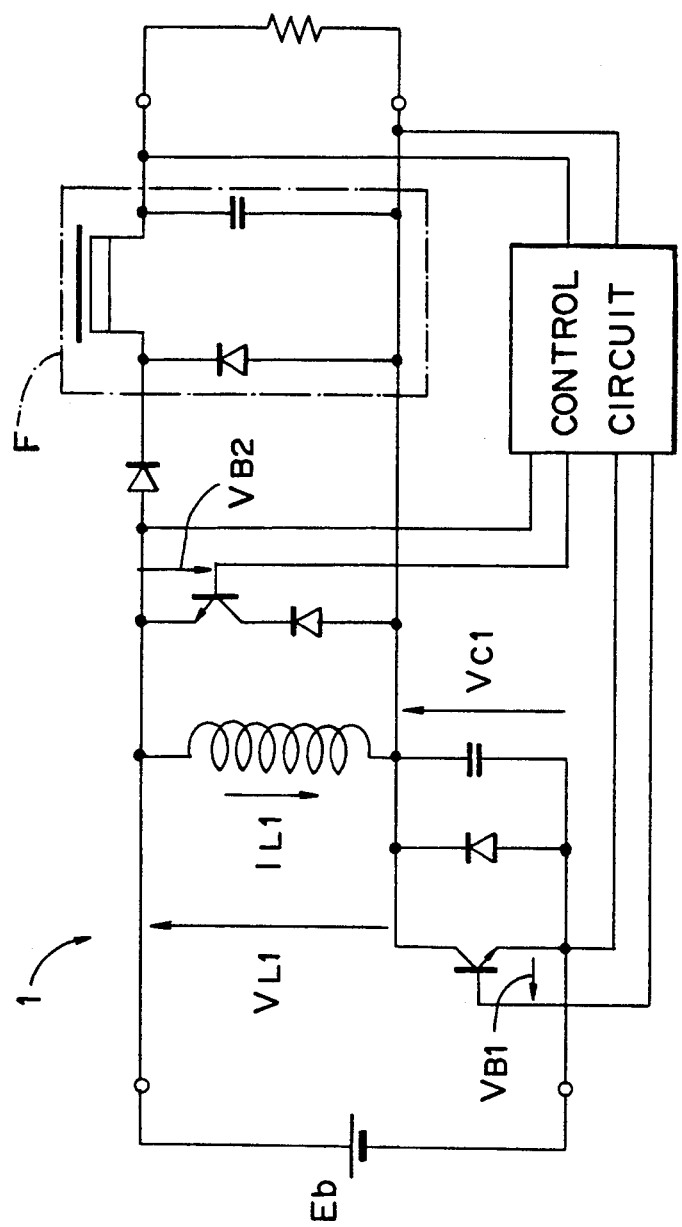
FIG. 1(b) is a circuit diagram showing signal names of the first embodiment of this invention.

FIG. 1(a) and FIG. 1(b) illustrate a DC—DC converter 1 according to the first embodiment of this invention. FIG. 1(a) shows reference numerals of components. FIG. 1(b) shows reference numerals of signals at each section of the circuit.

This DC—DC converter 1 has the basic construction wherein a DC power supply Eb, a coil L1, and a main switch Q1 are connected in series, a diode D1 and a resonant capacitor C1 are connected in parallel with the main switch Q1, and DC output is taken out from the two ends of the coil L1 via the rectifier DD and supplied to a load R1 via a filter F when the main switch Q1 is ON.

A control switch Q2 and a diode D2 are connected to the coil L1 so that the current due to energy accumulated in the coil L1 flows when the main switch Q1 is ON.

A control circuit 2 turns on/off the main switch Q1 at a specified cycle and stabilizes the current by adjusting the ON period according to the output voltage. Also the control circuit 2 adapts the ON period of the main switch Q1 to the resonance characteristic between the coil L1 and the resonant capacitor C1 by adjusting the ON period of the control switch Q2.

Figure 2:
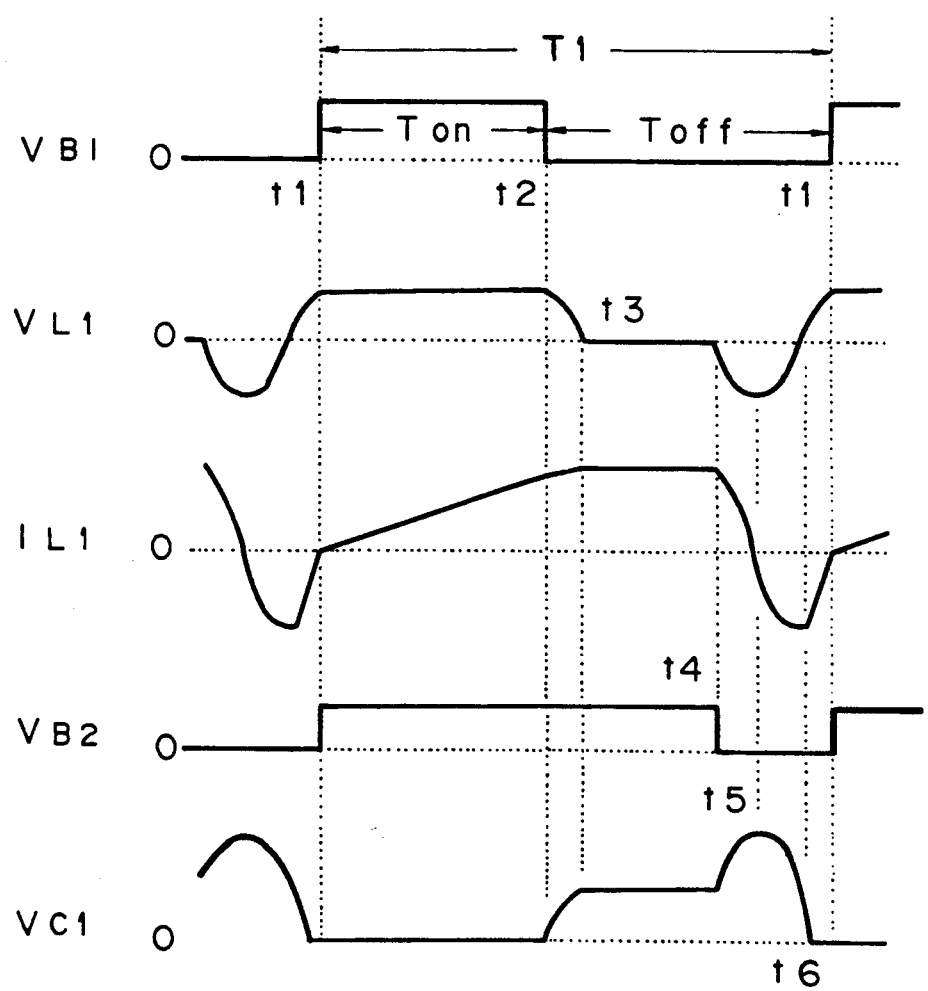
FIG. 2 is a time chart showing signals of the first embodiment of this invention.

Description is made below for operations of the DC—DC converter 1 with reference to FIG. 2.

When the main switch Q1 is turned ON according to a signal VB1 at the time point of t1, the voltage VL1 between both ends of the coil L1 becomes equal to that in the DC power supply Eb, and DC output is sent to the filter F via rectifier DD.

The current IL1 flowing in the coil L1 linearly increases.

Then, the control circuit 2 turns on the control switch Q2 according to a signal VB2, but reverse voltage is applied to the diode D2, so that current does not flow therein.

At the time point of t2, the control circuit 2 turns off the main switch Q2 according to a signal VB1, and the current flowing in the main switch Q1 moves to the resonant capacitor C1. The voltage VC1 between both ends of the resonant capacitor C1 rises according to the resonance characteristic between the coil L1 and the resonant capacitor C1, while the voltage VL1 between the two ends of the coil L1 goes down.

For this reason, the rectifier DD turns OFF, and DC current flow to the filter F is stopped.

If the voltage VC1 of the resonant capacitor C1 becomes larger that that of the DC power supply Eb and the voltage VL1 between the two ends of the coil L1 is a little negative, the diode D2 turns ON and resonance between the coil L1 and the resonant capacitor C1 is stopped. Because of this, the voltage between both ends of the coil L1 is kept at almost 0, the current IL1 at a constant level, and also the voltage in the resonant capacitor VC1 is kept at an almost constant level.

At the time point of t4, when the control switch Q2 is turned OFF according to the signal VB2, the resonance between the coil L1 and the resonant capacitor C1 is resumed, and the voltage VC1 between both ends of the resonant capacitor C1 goes up, while the voltage VL1 between both ends of the coil L1 becomes negative. Direction of the current IL1 flowing in the coil L1 is inverted.

When the voltage VC1 in the capacitor C1 becomes negative because of resonance, the diode D1 turns ON and the current IL1 flowing in the coil L1 linearly increases.

Then, operations after the aforesaid time point of t1 are repeated.

The filter F smooths the current supplied from the rectifier DD when the main switch Q1 is ON, and supplies the current to the load RL.

Then, the control circuit 2 repeats operations to turn on and off the main switch Q1 keeping a cycle T1 at a constant value, and at the same time adjusts the ON period of the main switch Q1 according to the output voltage for stabilization.

Since the DC—DC converter 1 described above is the forward type, a peak value of the current flowing in the coil L1 or the rectifier DD becomes smaller, and components for smaller current can be used.

Also, as energy supplied to the load is not accumulated in the coil L1, a small size coil can be used as the coil L1.

Additionally, a peak value of the current is small, the noise generation becomes lower.

Figure 3:
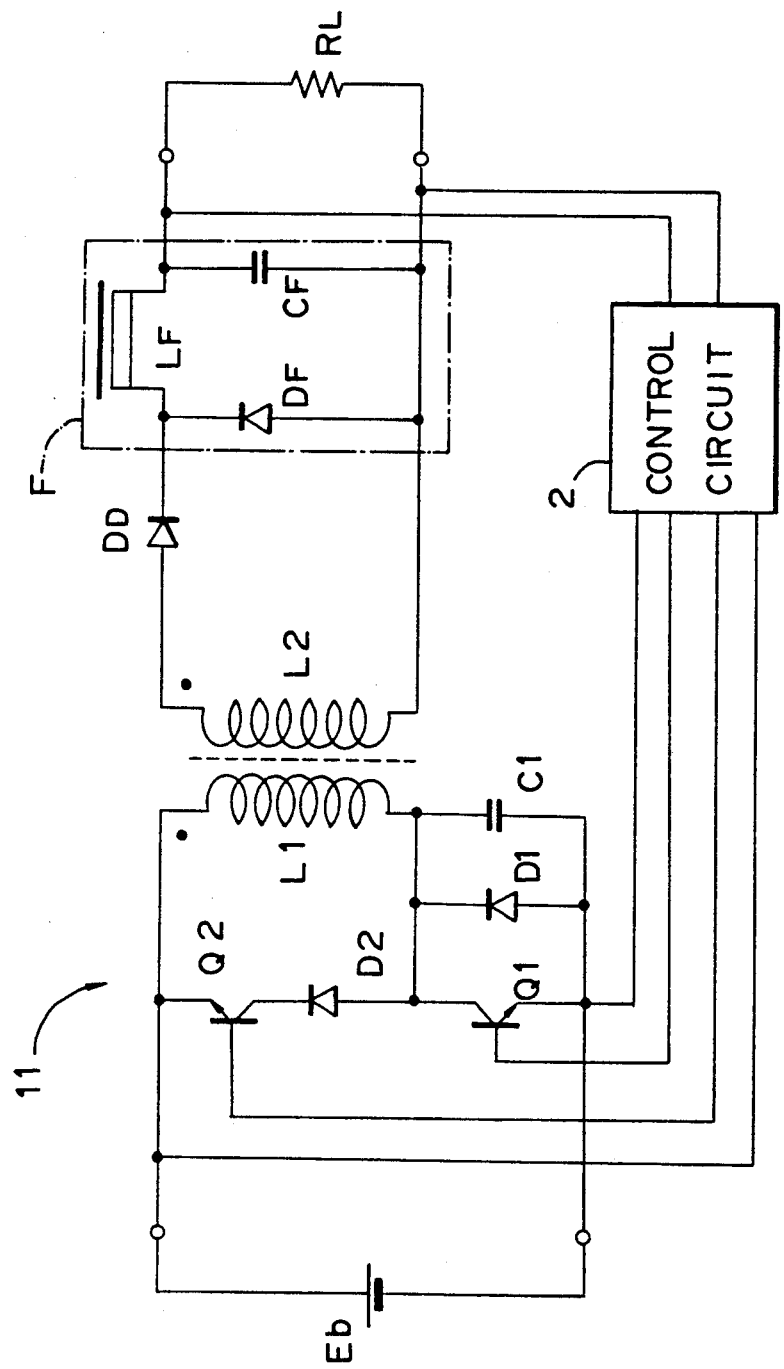
FIG. 3 is a circuit diagram of the second embodiment of this invention.

FIG. 3 is a circuit diagram illustrating a second embodiment of the DC—DC converter according to this invention.

This DC—DC converter 11 is different from the above DC—DC converter 1 in the point that, in said DC—DC converter 11, a primary coil L1 and a secondary coil L2 for a transformer are used in place of the coil L1 in the aforesaid DC—DC converter 1, but the configuration of other parts is the same as that of the DC—DC converter 1.

Figure 4:
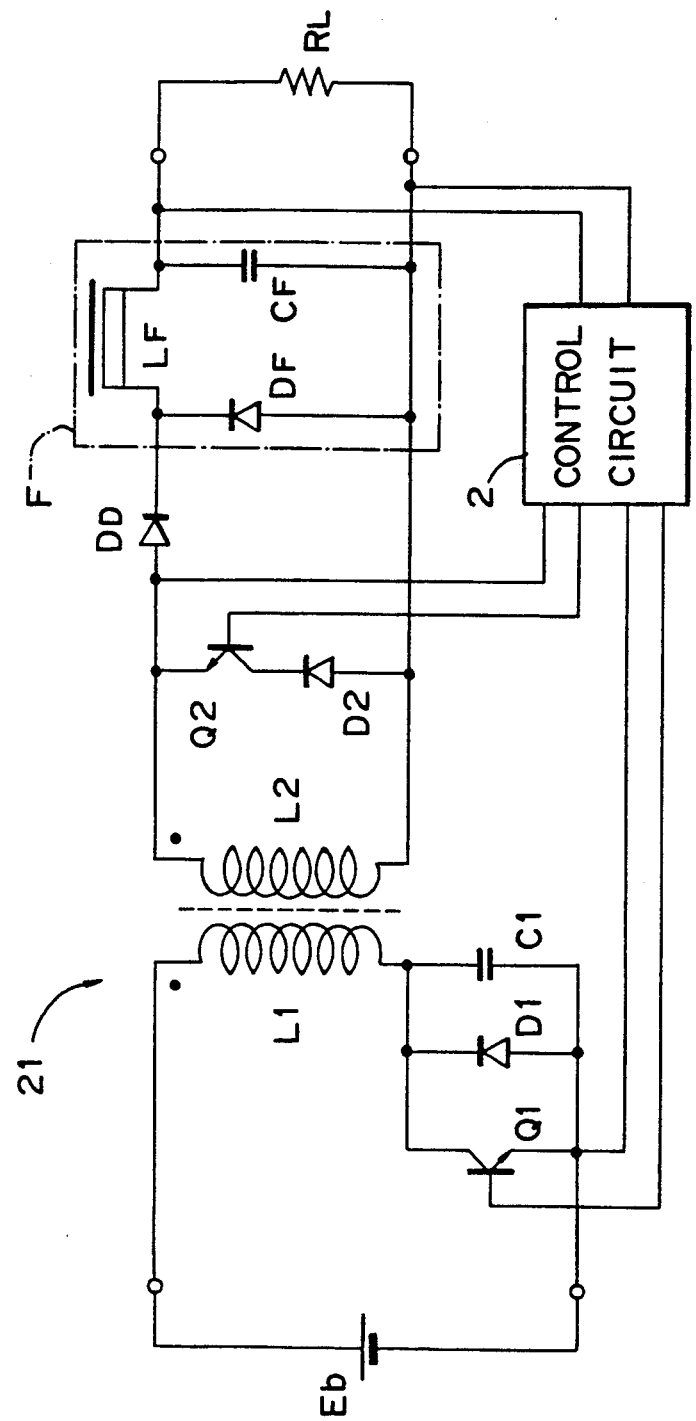
FIG. 4 is a circuit diagram of the third embodiment of this invention.
Figure 5:
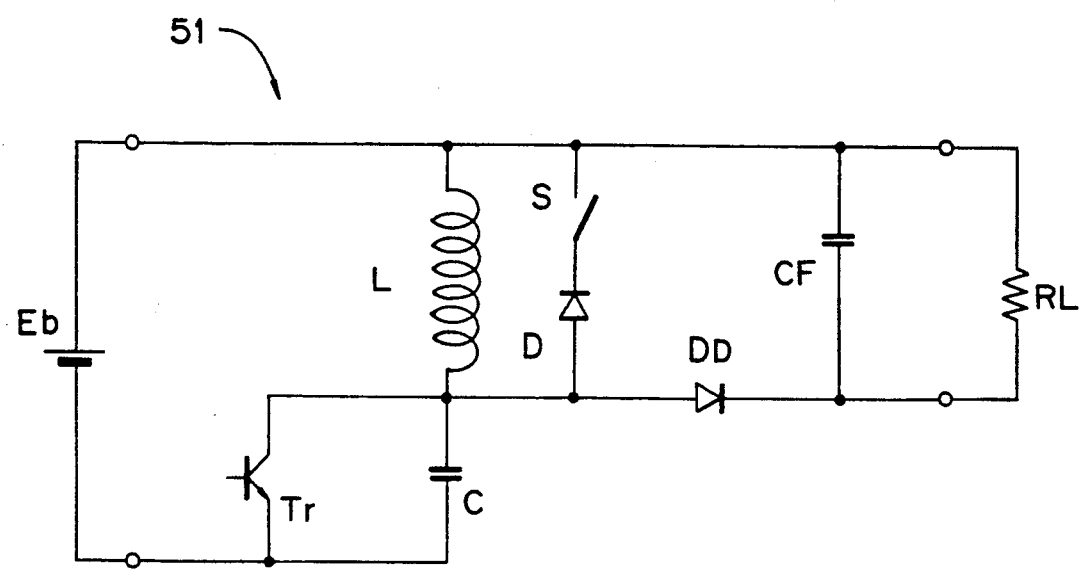
FIG. 5 is a circuit diagram of a conventional DC—DC converter.

FIG. 4 is a circuit diagram illustrating a third embodiment of the DC—DC converter according to this invention.

The difference between this DC—DC converter 21 and the DC—DC converter 11 described above consists in whether the diode D2 and the control switch Q2 are in the primary side or in the secondary side.

As described above, since the DC—DC converter according to this invention is a forward type, components for small current can be used. In addition, energy supplied to the load is not accumulated in the coil, a small coil can be used. Furthermore, since the peak value of the current is small, the noise generation can be reduced.

What is claimed is:

1. A DC—DC converter comprising a DC power supply having first and second terminals, a coil having first and second ends, means connecting said first end to said first terminal, a main switch, a resonant capacitor, means connecting said main switch in parallel with said capacitor to form a circuit having third and fourth ends, means connecting said second end to said third end, means connecting said fourth end to said second terminal, an output circuit a control circuit for said main switch, means coupling said output circuit to said first and second ends and a rectifier poled to conduct current to said output circuit when said main switch is turned ON by said control circuit a control switch, means connecting said control switch in parallel with said coil and means for controlling said control switch to allow current due to energy accumulated in the aforesaid coil to flow when said main switch is OFF.

2. A DC—DC converter comprising a DC power supply having first and second terminals, a first coil having first and second ends, means connecting said first end to said first terminal, a main switch, a resonant capacitor, means connecting said main switch in parallel with said capacitor to form a circuit having third and fourth ends, means connecting said second end to said third end, means connecting said fourth end to said second terminal, an output circuit a control circuit for said main switch, a connecting circuit coupling both ends of said first coil to said output circuit, said connecting circuit including a second coil electromagnetically linked to said first coil and a rectifier connected to said second coil and poled to allow current flow to said output circuit when said main switch is turned ON by said control circuit, a control switch, and means connecting said control switch in parallel with said first coil for allowing current due to energy accumulated in said first coil and said second coil to flow when said main switch is OFF.

3. A DC—DC converter comprising a DC power supply having first and second terminals, a first coil having first and second ends, a main switch, a resonant capacitor, means connecting said main switch in parallel with said capacitor to form a circuit having third and fourth ends, means connecting said second end to said third end, means connecting said fourth end to said second terminal an output circuit a control circuit for said main switch, a connecting circuit coupling both ends of said first coil to said output circuit, said connecting circuit including a second coil electromagnetically linked to said first coil and a rectifier connected to said second coil and poled to allow current flow to said output circuit when said main switch is turned ON by said control circuit a control switch, and means connecting said control switch in parallel with said second coil for allowing current due to energy accumulated in said first coil and said second coil to flow when said main switch is OFF.

4. The DC—DC converter of claim 1 wherein said means coupling said output circuit to said first and second ends of said coil comprises a second coil coupled to said first coil and connected in series with said output circuit.

* * * * *